(12) United States Patent
Stephens et al.

(10) Patent No.: US 10,969,113 B2
(45) Date of Patent: Apr. 6, 2021

(54) OVEN WITH STEAM WATER FLOW DIRECTORS

(71) Applicant: ILLINOIS TOOL WORKS INC., Glenview, IL (US)

(72) Inventors: Jason M. Stephens, Bonney Lake, WA (US); Troy R. Tope, Puyallup, WA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 548 days.

(21) Appl. No.: 15/305,214

(22) PCT Filed: Apr. 20, 2015

(86) PCT No.: PCT/US2015/026614
§ 371 (c)(1),
(2) Date: Oct. 19, 2016

(87) PCT Pub. No.: WO2015/164235
PCT Pub. Date: Oct. 29, 2015

(65) Prior Publication Data
US 2017/0045234 A1    Feb. 16, 2017

Related U.S. Application Data

(60) Provisional application No. 62/028,622, filed on Jul. 24, 2014, provisional application No. 61/982,698, filed on Apr. 22, 2014.

(51) Int. Cl.
*F24C 15/00* (2006.01)
*F24C 14/00* (2006.01)
*A21B 3/04* (2006.01)

(52) U.S. Cl.
CPC .............. *F24C 15/003* (2013.01); *A21B 3/04* (2013.01); *F24C 14/005* (2013.01)

(58) Field of Classification Search
CPC ......... F24C 14/005; F24C 15/003; A21B 3/04
See application file for complete search history.

(56) References Cited

U.S. PATENT DOCUMENTS

| | | | | |
|---|---|---|---|---|
| 2,856,166 A | * | 10/1958 | Goettl | F24F 6/04 |
| | | | | 261/29 |
| 3,245,668 A | * | 4/1966 | Goettl | F24F 6/04 |
| | | | | 261/94 |
| 3,831,580 A | | 8/1974 | McLean | |

(Continued)

FOREIGN PATENT DOCUMENTS

| | | |
|---|---|---|
| CH | 691280 | 6/2001 |
| CN | 1593303 | 3/2005 |

(Continued)

OTHER PUBLICATIONS

PCT, International Search Report and Written Opinion, International Application No. PCT/US2015/026614; dated Jun. 29, 2015, 10 pages.

*Primary Examiner* — Jorge A Pereiro
*Assistant Examiner* — Logan P Jones
(74) *Attorney, Agent, or Firm* — Thompson Hine LLP

(57) ABSTRACT

An oven includes a steam input arrangement with a thermal mass and one or more water flow directors to more effectively deliver water onto the thermal mass so that less water ends up bypassing the thermal mass.

12 Claims, 6 Drawing Sheets

(56) References Cited

U.S. PATENT DOCUMENTS

| | | | |
|---|---|---|---|
| 4,113,617 A | 9/1978 | Bereskin et al. | |
| 4,200,599 A * | 4/1980 | Goettl | F24F 6/04 261/106 |
| 4,234,526 A * | 11/1980 | Mackay | F24F 6/04 261/106 |
| 4,646,630 A | 3/1987 | McCoy et al. | |
| 4,657,709 A * | 4/1987 | Goettl | F24F 6/04 239/193 |
| 4,924,072 A | 5/1990 | Oslin | |
| 5,394,791 A | 3/1995 | Vallee | |
| 5,447,145 A | 9/1995 | Cappello et al. | |
| 5,549,038 A | 8/1996 | Kolvites | |
| 5,552,578 A | 9/1996 | Violi | |
| 5,601,013 A * | 2/1997 | Larsson | A21B 3/04 126/20 |
| 5,653,164 A | 8/1997 | Vallee | |
| 5,694,835 A | 12/1997 | Mangina | |
| 5,869,812 A | 2/1999 | Creamer et al. | |
| 6,213,002 B1 | 4/2001 | Batten et al. | |
| 6,435,078 B1 | 8/2002 | Batten et al. | |
| 6,516,712 B1 | 2/2003 | Ratermann et al. | |
| 6,582,205 B2 | 6/2003 | Batten et al. | |
| 6,966,582 B1 | 11/2005 | Malone et al. | |
| 8,193,470 B1 | 6/2012 | Harlamert et al. | |
| 2002/0170864 A1 | 11/2002 | Batten et al. | |
| 2003/0145847 A1 | 8/2003 | Deuringer et al. | |
| 2005/0076900 A1 | 4/2005 | Walther et al. | |
| 2005/0235980 A1 | 10/2005 | Hansen et al. | |
| 2006/0001273 A1 | 1/2006 | Smith et al. | |
| 2007/0262590 A1 | 11/2007 | Courter et al. | |
| 2008/0149553 A1 | 6/2008 | Sowerby et al. | |
| 2008/0223357 A1 | 9/2008 | Bartelick et al. | |
| 2008/0276925 A1 | 11/2008 | Griswold et al. | |
| 2009/0178576 A1 | 7/2009 | Valentine et al. | |
| 2012/0085244 A1 | 4/2012 | Giazzon et al. | |
| 2012/0111849 A1 * | 5/2012 | Henry | F24C 14/005 219/401 |
| 2013/0133638 A1 | 5/2013 | Kulakowski et al. | |
| 2013/0234578 A1 | 9/2013 | Ala et al. | |
| 2013/0318880 A1 | 12/2013 | Edwards et al. | |
| 2013/0319393 A1 | 12/2013 | Harward et al. | |
| 2014/0290500 A1 | 10/2014 | Wurdinger et al. | |
| 2014/0311360 A1 | 10/2014 | Bartelick et al. | |
| 2014/0319119 A1 | 10/2014 | Raghavan et al. | |

FOREIGN PATENT DOCUMENTS

| | | |
|---|---|---|
| CN | 1729374 | 2/2006 |
| DE | 19843842 | 3/2000 |
| DE | 10157808 A1 | 6/2003 |
| DE | 202004000106 | 6/2004 |
| DE | 202009006424 | 8/2009 |
| DE | 102008025294 | 12/2009 |
| DE | 102012221857 | 5/2013 |
| EP | 0712578 | 5/1996 |
| EP | 1102010 | 5/2001 |
| EP | 1384406 | 1/2004 |
| EP | 1148764 | 6/2004 |
| EP | 1517092 | 3/2005 |
| EP | 1914479 | 4/2008 |
| EP | 2703729 | 3/2014 |
| GB | 2163845 | 8/1985 |
| GB | 2163845 | 3/1986 |
| KR | 20130027863 | 3/2013 |
| WO | WO 9117661 | 11/1991 |
| WO | WO 2004/094912 | 3/2005 |
| WO | WO 2002/068876 | 9/2005 |
| WO | WO 2011/128103 | 10/2011 |

* cited by examiner

OVEN WITH STEAM WATER FLOW DIRECTORS

TECHNICAL FIELD

This application relates generally to ovens and, more specifically, to an oven with a steam input arrangement that more effectively directs water onto a thermal mass for purposes of steam production.

BACKGROUND

In ovens that include steam production, water consumption is an issue. In some ovens (e.g., baking ovens) it is common to cook without steam for a period of time and then deliver steam into the cooking chamber at a specified time during the cooking process to achieve desired food product quality. Often times a thermal mass is used to create steam by directing water onto the thermal mass. The impingement of the water onto the hot thermal mass causes nearly instantaneous conversion of the water to steam, which then fills the oven cooking chamber. U.S. Pat. No. 6,516,712 discloses one embodiment of an oven of this type. However, as general rule not all of the water is converted to steam, and the unconverted water passes to a drain, resulting in undesired waste of water.

It would be desirable to provide an oven with a steam input arrangement that more effectively converts incoming water to steam.

SUMMARY

An oven includes a steam input arrangement with a thermal mass and one or more water flow directors to more effectively deliver water onto the thermal mass so that less water ends up bypassing the thermal mass.

In one aspect, an oven includes a cooking chamber, a spray system for spraying cleaning fluid in the cooking chamber and a steam input arrangement for delivering steam into the cooking chamber. The steam input arrangement includes an upright heat accumulator arrangement to which water is delivered to generate steam as the water comes into contact with the heat accumulator arrangement. The heat accumulator arrangement is positioned alongside a wall surface of the oven. At least one water flow director is positioned to collect water that is flowing down past the heat accumulator arrangement along the wall surface and redirect the collected water away from the wall surface and back onto the heat accumulator arrangement.

In another aspect, an oven includes a cooking chamber and a steam input arrangement for delivering steam into the cooking chamber. The steam input arrangement includes an upright heat accumulator arrangement to which water is delivered to generate steam as the water comes into contact with the heat accumulator arrangement. The heat accumulator arrangement is positioned alongside a wall surface of the oven. At least one water flow director is positioned to collect water that is flowing down past the heat accumulator arrangement along the wall surface and redirect the collected water away from the wall surface and back onto the heat accumulator arrangement.

In another aspect, an oven includes a cooking chamber and a steam input arrangement for delivering steam into the cooking chamber. The steam input arrangement includes an upright heat accumulator arrangement to which water is delivered to generate steam as the water comes into contact with the heat accumulator arrangement. The heat accumulator arrangement is positioned alongside a wall surface of the oven, and includes multiple vertically spaced heat accumulator element units. Multiple water flow directing rails are positioned to collect water that is flowing down past the heat accumulator arrangement along the wall surface and to redirect the collected water away from the wall surface and back onto the heat accumulator arrangement. The multiple water flow directing rails are vertically spaced apart from each other along a height of the heat accumulator arrangement. At least one of the water flow directing rails includes both (i) an upwardly facing channel that receives a bottom end of a first one of the heat accumulator element units so that the channel limits outward movement of the bottom end away from the wall surface and (ii) a downwardly extending flange that is positioned alongside an upper end of a second one of the heat accumulator element units so that the flange limits outward movement of the upper end away from the wall surface.

In yet a further aspect, a method is provided for producing steam within an oven that includes a cooking chamber and a heat accumulator arrangement that is heated by oven operation, the heat accumulator arrangement alongside a wall surface. The method involves: delivering water onto the heat accumulator arrangement to convert the water to steam; and diverting some water that impinges upon the wall surface and is running down the wall surface alongside the heat accumulator arrangement away from the wall surface and back onto the heat accumulator arrangement in order to reduce an amount of water that is required to produce a desired amount of steam.

The details of one or more embodiments are set forth in the accompanying drawings and the description below. Other features, objects, and advantages will be apparent from the description and drawings, and from the claims.

DETAILED DESCRIPTION

Figure 1:
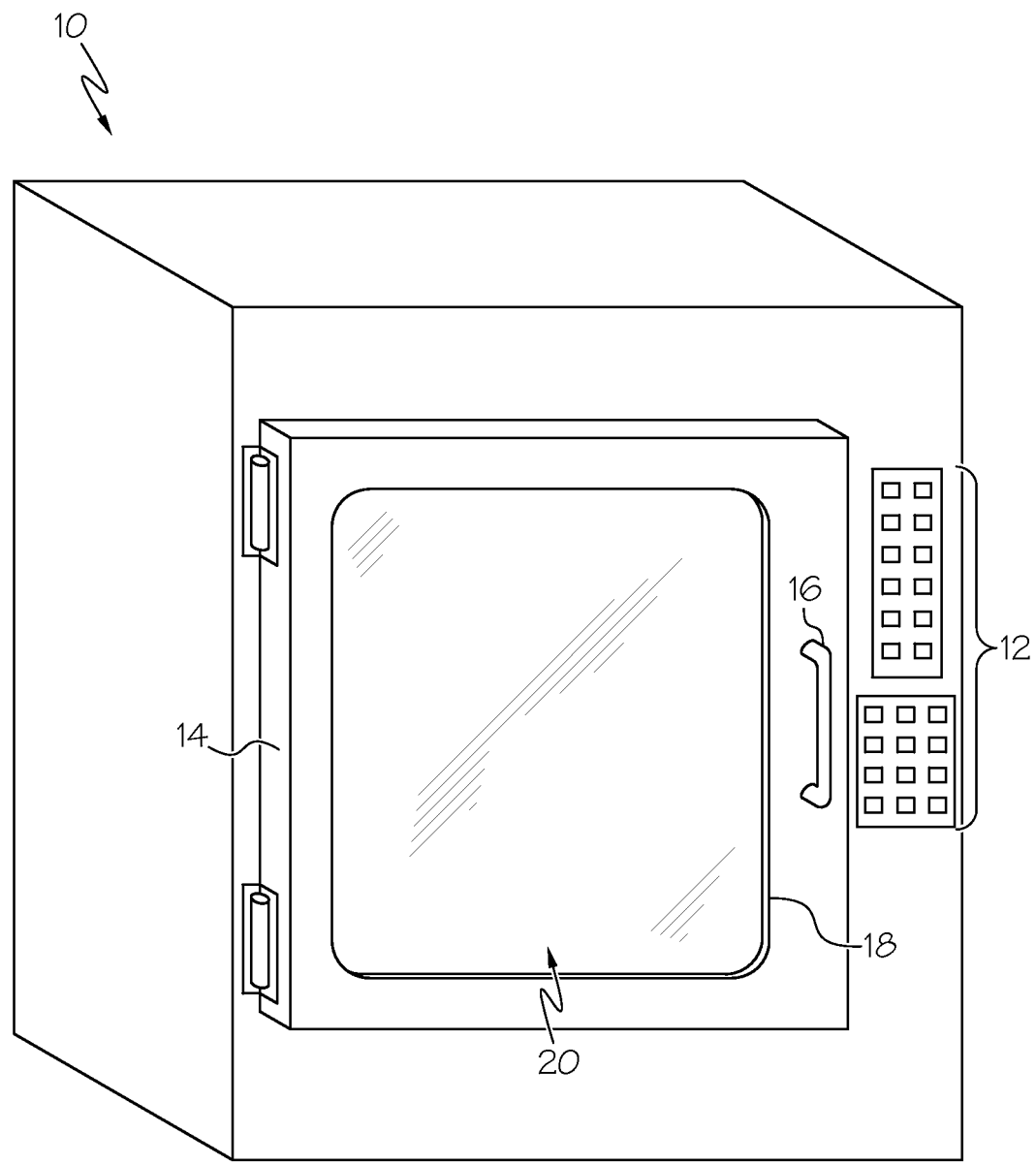
FIG. 1 is a perspective view of an oven.

Referring to FIG. 1, an exemplary oven 10 is shown. The oven 10 includes a control interface 12, which may include a variety of components, such as an information display area, a numeric keypad, ON/OFF buttons/keys, function specific buttons/keys, and/or various indicator lights. The oven 10 includes a hinged access door 14 with a handle 16 and glass area 18 for viewing the internal cooking chamber 20. In one embodiment, the door 14 may be vertically hinged so that the door 14 pivots horizontally. The door 14 is generally movable between a closed position and one or more open positions relative to an access opening to the internal cooking chamber 20. In one example, the oven 10 is a type that includes a heating source (e.g., electrical or gas-powered), a blower for moving air past the heating source, and a steam generation system. In one embodiment, stationary, removable racks may be located in the cooking chamber 20, while in another embodiment a movable food supporting structure (e.g., a rack rotation or rotisserie mechanism) may be located within the cooking chamber 20.

Figure 2:
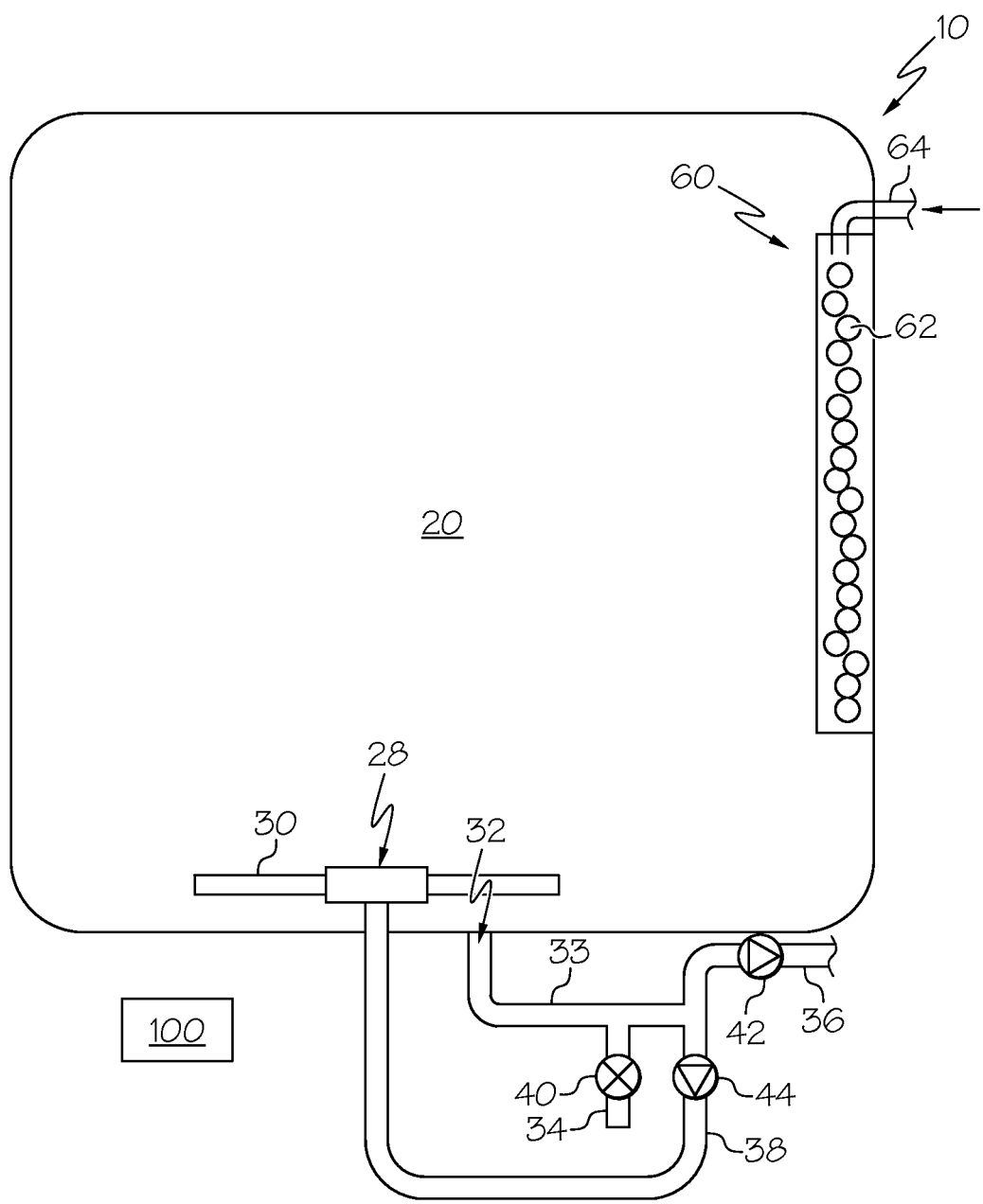
FIG. 2 is a schematic depiction of an oven and associated drain and cleaning flow arrangement and steam input arrangement.

As shown in the schematic of FIG. 2, the oven 10 also includes an internal spraying system 28 for cleaning purposes. In one embodiment, the spraying system 28 is formed by a rotatable spray arm 30 with multiple nozzles thereon, located at the bottom of the cooking chamber 20. However, stationary spray systems 28 could also be used. As shown in FIG. 2, the bottom of the cooking chamber 20 is configured to direct liquid flows toward a drain 32 which may have a cover screen. In this regard, liquids in the oven 10 will tend to move under gravity toward the drain 32, including liquids from the spray cleaning system (spraying system 28), liquids from any steam that condenses within the oven 10, and liquids generated directly by cooking foods (e.g., water, oils and grease that come out or off of heated food products). Thus, drain 32 acts as a universal drain for all such liquid flows. The universal drain 32 can deliver such flows along a common flow path 33 (referred to herein, in the alternative, as the chamber drain flow path) and then to any of a grease drain path 34 (e.g., that leads to a grease collecting compartment or container), a water drain path 36 (e.g., that leads to a municipal drain system or septic), or a water recirculation path 38 (e.g., leading back to the spray nozzles within the cooking chamber 20). A valve 40 controls flow along the grease drain path 34, a drain pump 42 controls flow along water drain path 36, and a wash pump 44 controls flow along water recirculation path 38.

The oven chamber also includes a steam input arrangement 60, which may be formed by a mass of metal 62, which acts a heat accumulator, and onto which water is delivered by a water input path 64 in order to generate. By way of example, the metal mass may be similar to that described in U.S. Pat. No. 6,516,712, but variations are possible. The heat accumulator arrangement 60 is located along a wall surface 94, which, by way of example, may be a wall surface of the chamber 20 itself, or may be a wall surface of a compartment alongside the chamber 20.

Figure 3:
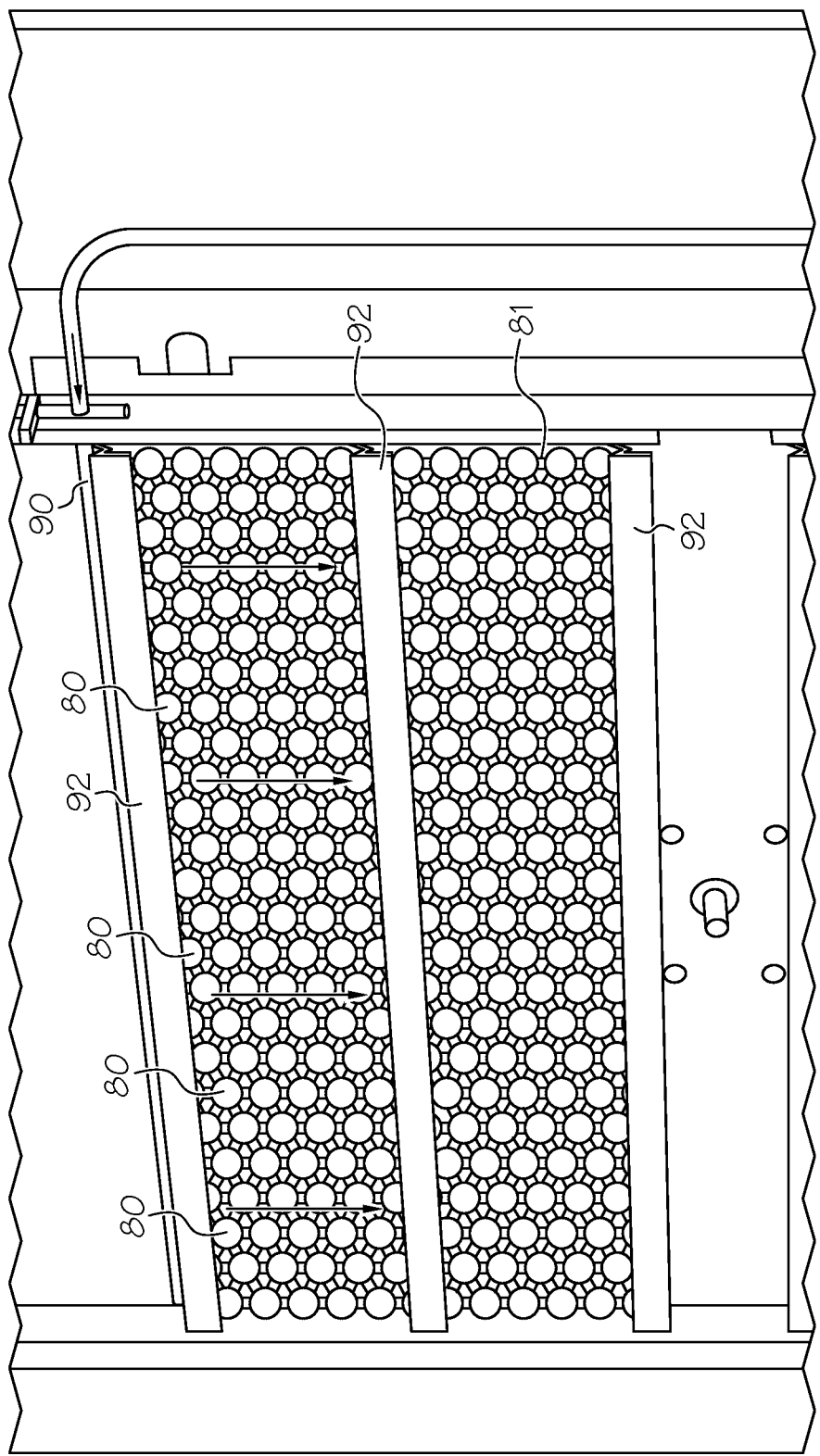
FIGS. 3-5 are partial perspective views of various aspects of the steam input arrangement.
Figure 4:
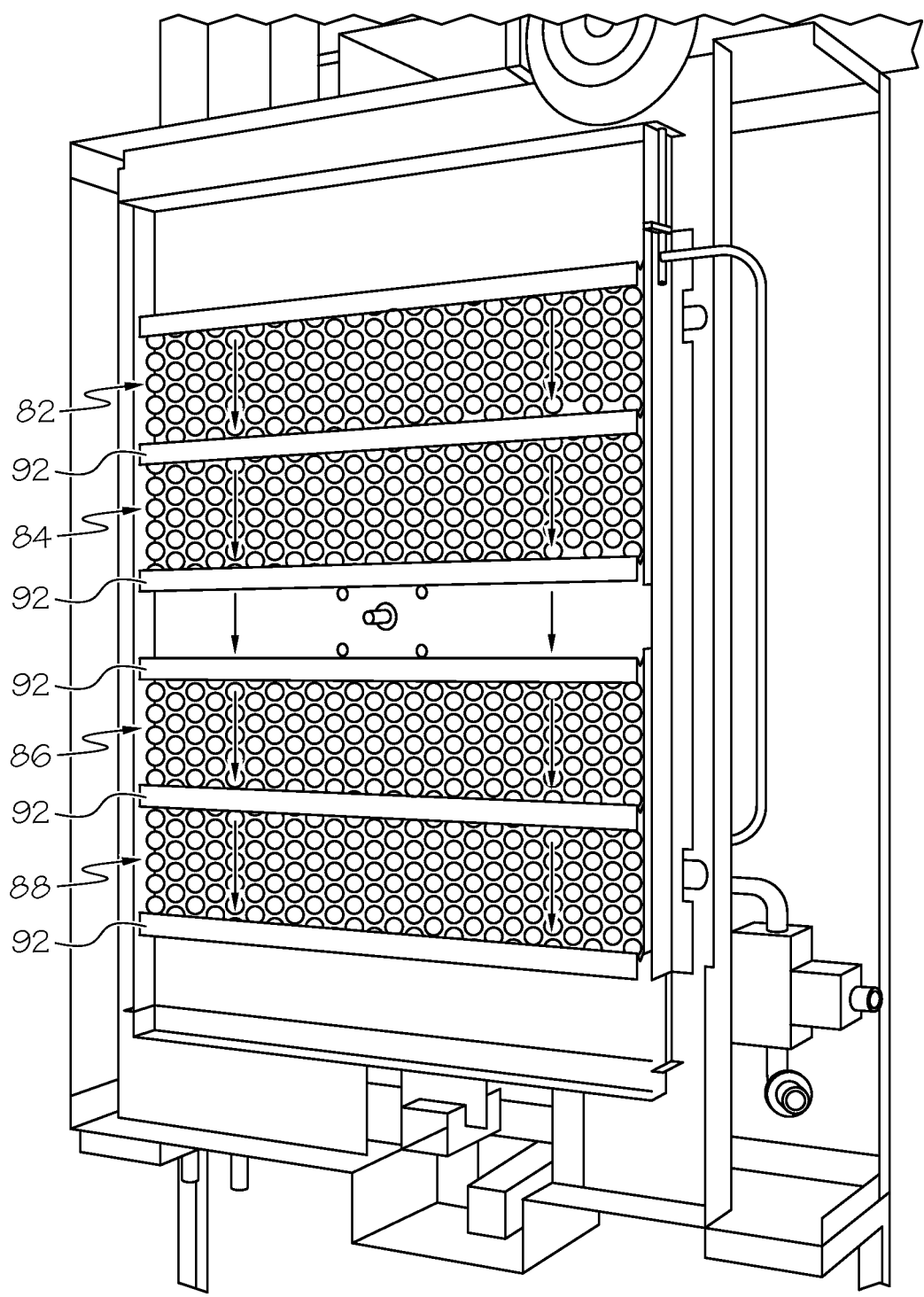

As seen in FIGS. 3 and 4, in the illustrated embodiment the heat accumulator mass 62 is made up of a plurality of ball-shaped elements 80 that are interconnected by joining portions 81 to create a rigid structure or heat accumulator unit formed of many of the elements 80. The rigid structures are mounted or otherwise extend in an upright manner, generally parallel with the wall surface 94 so as to avoid taking up excessive space in the chamber or oven footprint. Multiple heat accumulator element sections 82, 84, 86 and 88 are arranged vertically as shown. In each such section, the elements 80 may be formed as a single rigid structure or unit, or multiple rigid structures or units may be positioned side by side.

To produce steam water is delivered via an overhead pipe 90 having a set of downwardly facing openings along its length that are arranged to flow the water onto the heat accumulator structures. Because the heat accumulator elements are extremely hot (e.g., heated to a high temperature by the same heating system that produces heat for heating the chamber 20 for cooking), when the water impinges upon the heat accumulator elements 80 the water is converted to steam in a nearly instantaneous manner that enables the chamber 20 to fill with steam rapidly. In order to produce a large quantity of steam, a large volume of water is delivered onto the heat accumulator arrangement, and it is therefore desirable to assure that the delivered water is effectively converted to steam.

In this regard, some water may attach to the wall surface 84, causing it to move down the wall surface in a manner that avoids the heat accumulator arrangement. If not dealt with, such water will not be converted to steam. Accordingly, to limit the extent of this problem, flow directors 92 are positioned at various locations along the height of the heat accumulator arrangement. In the illustrated embodiment, the flow directors are located between the heat accumulator element sections 82 and 84, 84 and 86 and 86 and 88. The same flow directors may also be located at the top of section 82 and bottom of section 88 for heat accumulator element retention as will be described in more detail below.

Figure 5:
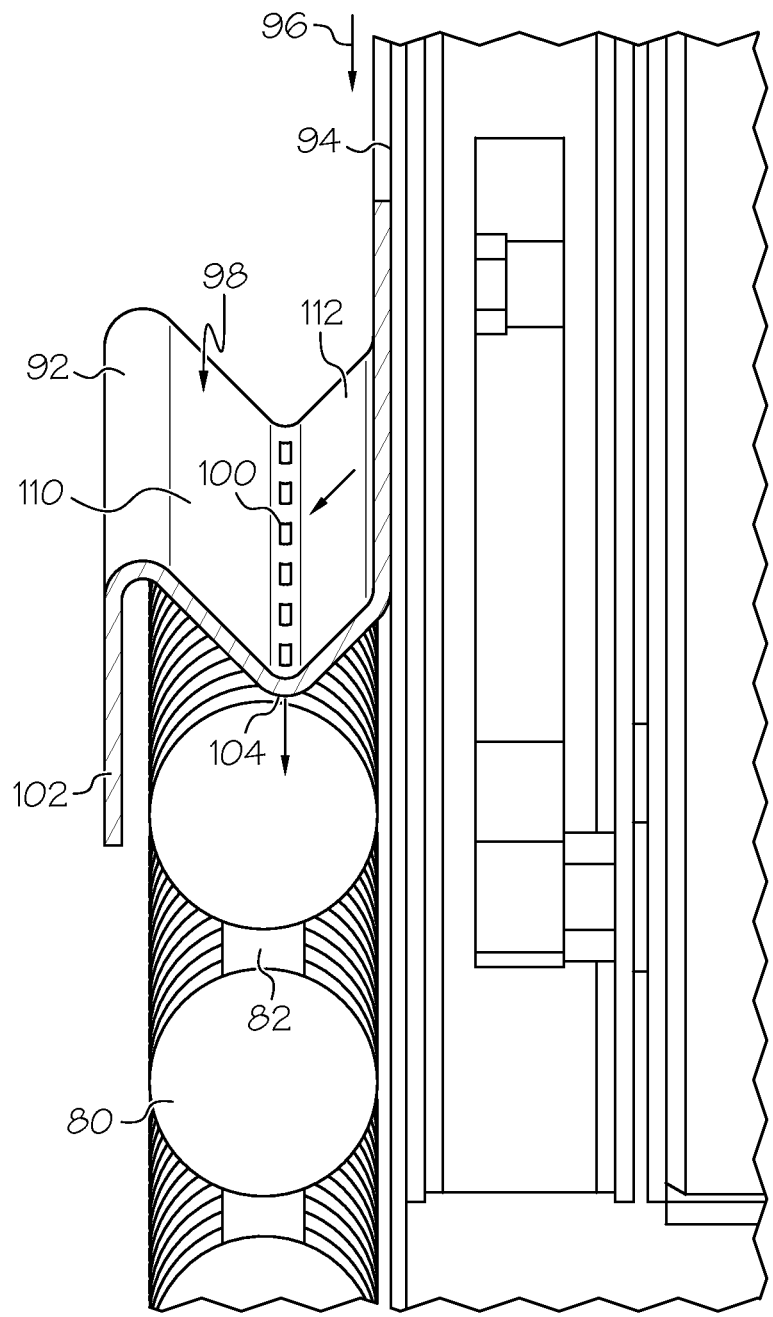

As shown, each flow director 92 may be in the form of an elongated rail member (e.g., formed by applying multiple bends to an elongated a flat metal strip, or formed as an extrusion) having an upwardly facing channel 98 for receiving collected water. Per FIG. 5, the channel includes multiple openings 100 along its length for releasing collected water onto a portion the heat accumulator arrangement below the channel. A flange 102 on a side of the channel 98 that is spaced from the wall surface 94 extends downwardly lower than a bottom 104 of the channel 102. Another flange 106 on an opposite side of the channel 98 that is located toward the wall surface 94 extends upwardly and in contact with the wall surface 94. In the illustrated embodiment the channel 98 itself is V-shaped and formed by outwardly and upwardly extending channel walls 110 and 112, and each flange 10 and 106 has a substantially vertical orientation, though variations are possible.

Thus, each flow director 92 abuts the wall surface 94 such that water 96 running down the surface is redirected into the channel or trough 98 that overlies heat accumulator elements. The channel 98 includes a plurality of openings along its length to drop the water onto the heat accumulator elements 80 below the channel. Thus, the flow directors capture water that would have bypassed the heat accumulators and redirect it back onto the heat accumulator arrangement. By capturing and redirecting water at multiple locations along the height of the steam input arrangement, more efficient production of steam is achieved per unit of input water. A trough or other collector rail may also be provided at the bottom of the arrangement to collect excess water and direct it through an opening in the wall surface 94 to remove the water from the chamber.

Figure 6:
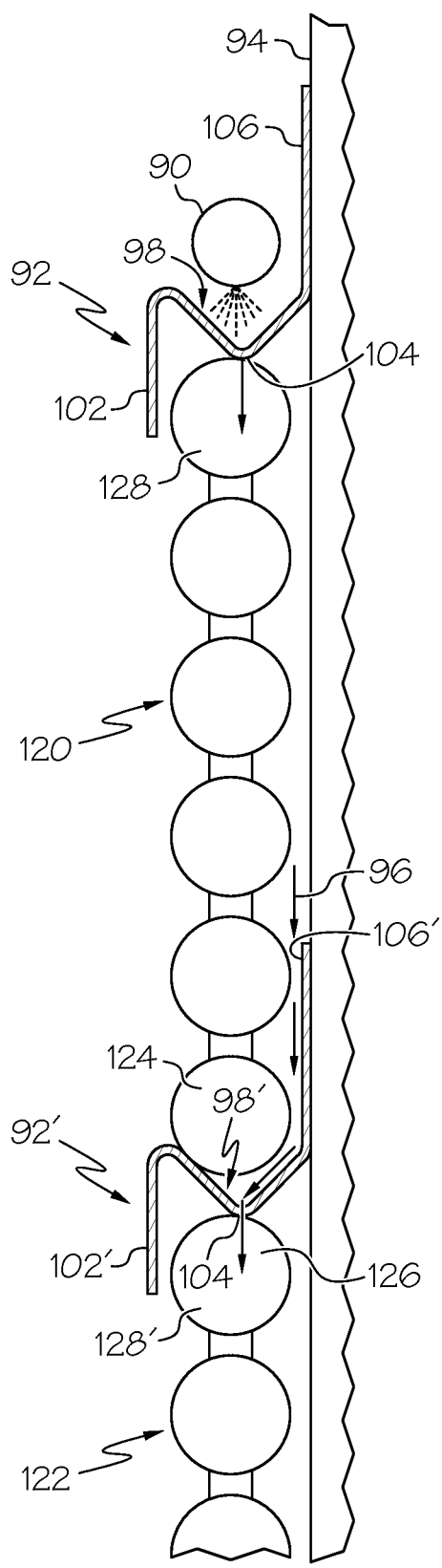
FIG. 6 is a partial side elevation view of the steam input arrangement.

As best seen in FIG. 6, the flow diverters 92 also acts to hold the heat accumulator element units in place. In particular, a first heat accumulator element unit 120 (e.g., in section 82 of FIGS. 3 and 4) is spaced vertically above a heat accumulator element unit 122 (e.g., in section 84 of FIGS. 3 and 4). Water flow director 92' is located between the units 120 and 122. A bottom end 124 of the heat accumulator element unit 120 is positioned within the channel 98' of flow director 92' so that the channel 98' limits outward movement of the bottom end 124 away from the wall surface 94. Flange 106' captured water traveling down wall surface 94 and directs it into the channel 98'. A an upper end 126 of the heat accumulator element unit 122 is positioned alongside the flange 102' so that the flange 102' limits outward movement of the upper end 126 away from the wall surface 94. The upper flow director 92 of FIG. 6 receives water from the pipe 90 and directs it down onto heat accumulator element unit 120. At the same time, the upper end 128 of heat accumulator element unit 120 is positioned within the space formed between flange 102 and wall surface 94 to limit outward movement of the upper end 128 from the wall surface. Thus, the flow directors 92 laterally retain the heat accumulator element units in place.

In one embodiment the flow directors 92 may be secured to the wall surface 94 (e.g., using fasteners or a pin and slit arrangement), in which case the flow directors can be removed for the purpose of enabling the team steam input arrangement to be disassembled. In an alternative embodiment the flow directors 92 may be fixed to the wall surface 94 (e.g., welded to the wall surface), but the heat accumulator element units may be moved in and out of the steam input arrangement via a sliding operation from one or both ends of the flow directors 92.

It is to be clearly understood that the above description is intended by way of illustration and example only, is not intended to be taken by way of limitation, and that other changes and modifications are possible.

What is claimed is:

1. An oven, comprising:
a cooking chamber;
a steam input arrangement for delivering steam into the cooking chamber and including an upright heat accumulator arrangement to which water is delivered to generate steam as the water comes into contact with the heat accumulator arrangement, the heat accumulator arrangement positioned alongside a wall surface of the oven;
wherein at least one water flow director is positioned to collect water that is flowing down past the heat accumulator arrangement along the wall surface and redirect the collected water away from the wall surface and back onto the heat accumulator arrangement; and
wherein the water flow director is in the form of an elongated rail member having an upwardly extending flange in contact with the wall surface;
wherein the heat accumulator arrangement includes at least a first heat accumulator element unit spaced vertically above a second heat accumulator element unit, wherein the water flow director is located between the first heat accumulator element unit and the second heat accumulator element unit so as to be positioned at an intermediate point along a height of the heat accumulator arrangement and at an intermediate point along a height of the wall surface, with the upwardly extending flange in contact with the wall surface and extending alongside a lower portion of first heat accumulator element unit;
wherein the water flow director includes a downwardly extending flange on a side of the heat accumulator arrangement that is spaced from the wall surface;
wherein the elongated rail member includes an upwardly facing channel for receiving collected water, the channel including one or more openings along its length for releasing the water back onto the heat accumulator arrangement, and the downwardly extending flange extends downwardly lower than a bottom of the channel.

2. The oven of claim 1 wherein the upwardly extending flange directs water from the wall surface into the upwardly facing channel.

3. The oven of claim 1 wherein at least a first water flow director and a second water flow director are vertically spaced apart and configured to retain heat accumulator units in place along the wall surface.

4. The oven of claim 1 wherein a bottom end of the first heat accumulator element unit is positioned within the channel so that the channel limits outward movement of the bottom end away from the wall surface, and an upper end of the second heat accumulator element unit is positioned alongside the downwardly extending flange so that the downwardly extending flange limits outward movement of the upper end away from the wall surface.

5. The oven of claim 1 wherein the wall surface in part defines the cooking chamber.

6. An oven, comprising:
a cooking chamber;
a steam input arrangement for delivering steam into the cooking chamber and including an upright heat accumulator arrangement to which water is delivered to generate steam as the water comes into contact with the heat accumulator arrangement, the heat accumulator arrangement positioned alongside a wall surface of the oven;
wherein at least one water flow director is positioned to collect water that is flowing down past the heat accumulator arrangement along the wall surface and to redirect the collected water away from the wall surface and back onto the heat accumulator arrangement;
wherein the water flow director is in the form of an elongated rail member having an upwardly facing channel for receiving collected water, the channel including one or more openings along its length for releasing the water back onto the heat accumulator arrangement, a first flange on one side of the channel spaced from the wall surface and extending downwardly lower than a bottom of the channel, and a second flange on an opposite side of the channel toward the wall surface and extending upwardly and in contact with the wall surface.

7. The oven of claim 6 wherein the water flow director is positioned at an intermediate point along a height of the heat accumulator arrangement.

8. The oven of claim 6 wherein the heat accumulator arrangement includes at least a first heat accumulator element section and a second heat accumulator element section, where the first heat accumulator element section is spaced vertically above the second heat accumulator element section, and the water flow director is positioned below the first heat accumulator element section and above the second heat accumulator element section and abuts the wall surface to collect water flowing down the wall surface alongside the first heat accumulator element section and redirect the collected water away from the wall and onto the second heat accumulator element section.

9. The oven of claim 6 wherein at least a first water flow director and a second water flow director are vertically spaced apart and configured to retain heat accumulator units in place along the wall surface.

10. The oven of claim 6 wherein the heat accumulator arrangement includes at least a first heat accumulator element unit spaced vertically above a second heat accumulator element unit, the water flow director is located between the first heat accumulator element unit and the second heat accumulator element unit, wherein a bottom end of the first heat accumulator element unit is positioned within the channel so that the channel limits outward movement of the bottom end away from the wall surface, and an upper end of the second heat accumulator element unit is positioned alongside the first flange so that the first flange limits outward movement of the upper end away from the wall surface.

11. An oven, comprising:
a cooking chamber;
a steam input arrangement for delivering steam into the cooking chamber and including an upright heat accumulator arrangement to which water is delivered to generate steam as the water comes into contact with the heat accumulator arrangement, the heat accumulator arrangement positioned alongside a wall surface of the oven, the heat accumulator arrangement including multiple vertically spaced heat accumulator element units;

wherein multiple water flow directing rails are positioned to collect water that is flowing down past the heat accumulator arrangement along the wall surface and redirect the collected water away from the wall surface and back onto the heat accumulator arrangement, the multiple water flow directing rails vertically spaced apart from each other along a height of the heat accumulator arrangement, and at least one of the water flow directing rails includes both (i) an upwardly facing channel that receives a bottom end of a first one of the heat accumulator element units so that the channel limits outward movement of the bottom end away from the wall surface and (ii) a downwardly extending flange that is positioned alongside an upper end of a second one of the heat accumulator element units so that the downwardly extending flange limits outward movement of the upper end away from the wall surface.

12. The oven of claim 11 wherein the wall surface in part defines the cooking chamber.

* * * * *